May 19, 1970  J. G. LOWE  3,512,814
SCAFFOLD COUPLINGS

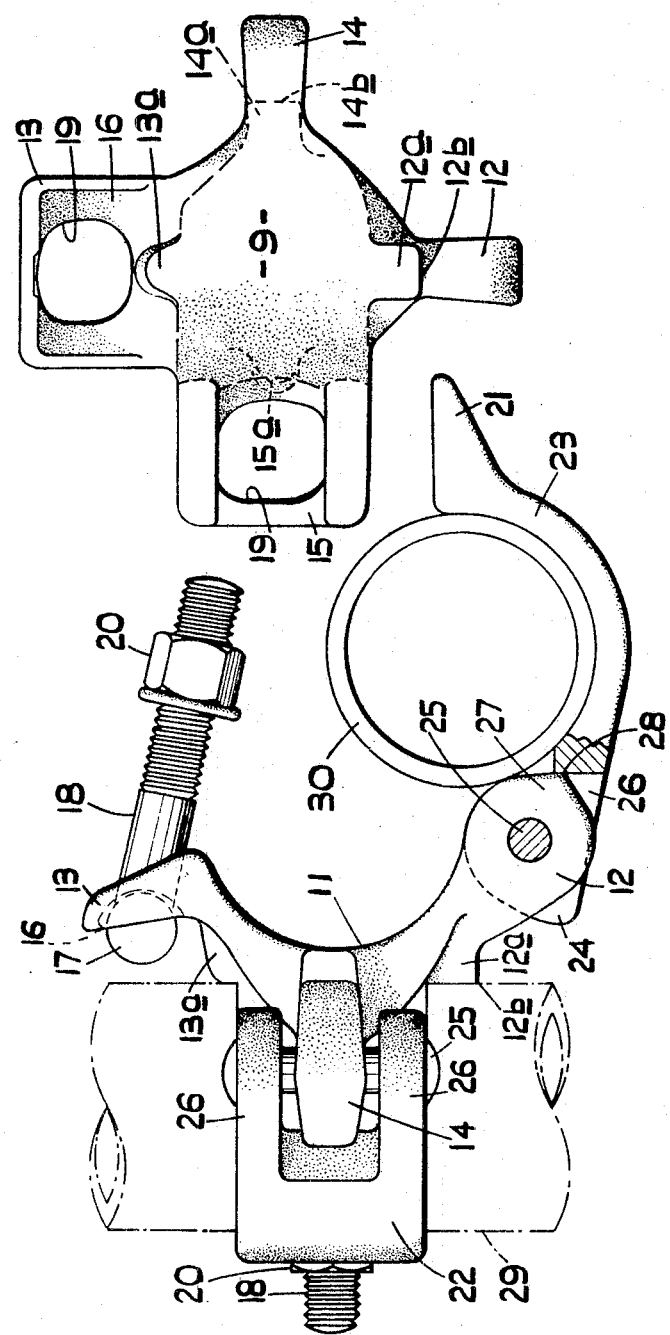

Filed Dec. 6, 1967  3 Sheets-Sheet 2

Inventor
J. G. Lowe

United States Patent Office 3,512,814
Patented May 19, 1970

3,512,814
SCAFFOLD COUPLINGS
Jack Graham Lowe, Belbroughton, England, assignor to Burton Delingpole & Company Limited, Cradley Heath, Warley, England, a British company
Filed Dec. 6, 1967, Ser. No. 688,602
Claims priority, application Great Britain, Dec. 6, 1966, 54,519/66; Mar. 4, 1967, 10,338/67; May 25, 1967, 24,364/67
Int. Cl. E04g 7/00
U.S. Cl. 287—54                                    3 Claims

ABSTRACT OF THE DISCLOSURE

This invention relates to scaffold couplings for connecting a pair of scaffold tubes in mutually transverse relationship, and is concerned with producing the couplings in a particularly economical manner in respect in particular of material savings and rate of production.

BACKGROUND OF THE INVENTION

Field of the invention

This invention relates to scaffold couplings for connecting a pair of scaffold tubes in mutually transverse relationship and which are of the kind herein called the "kind specified," comprising a central body having a pair of mutually transverse concavedly curved seatings, which body is adapted to extend between the tubes, the body being provided with two mutually transverse pairs of lugs with the two lugs in each pair disposed at diametrically opposite sides of the central body, one of the two lugs in each pair having hinged thereto one end of an arcuate shaped tube embracing clamping jaw, which one end is forked to receive between the arms of the fork, part of the adjacent body lug and the other lug of each of the two pairs of lugs being recessed at the side thereof directed away from the jaw which is hinged to the first mentioned lug of such pair, the recessed part providing a hinge bearing for the head of a T-shaped clamping bolt which extends through a hole in the recessed lug and which carries a nut on its free end portion for clamping engagement with the free end of said hinged jaw, the central body together with its two pairs of lugs being formed as a forging, e.g. as a drop forging.

One of the most common arrangements in couplings of the kind specified, is that in which the two seatings are mutually perpendicular so as to secure the two tubes at right angles to one another and in such an arrangement the body, together with its two pairs of lugs, is formed as a one-piece forging.

In another arrangement the body may be formed as two separate forgings, each comprising one seating portion and one diametrically opposed pair of lugs for securing to such seating portion one of the two jaws as above described, the two separate forgings being connected swivelably together so as to permit of the coupling being used where the two tubes are required to be secured at different relative inclinations in mutually transverse relationship.

Description of the prior art

Hitherto in couplings of the kind specified, each jaw hinge lug has beeen formed to substantially T-configuration in cross section, with the two flanges of the T forming an extension of each of the two seatings in the case of a one-piece forging, and of one of the two seatings as applied to a swivel form of coupling mentioned above, while the two flanges of the T section lug commonly further provide an abutment against which the outer faces of the two fork arms of the adjacent end of the jaw can abut to limit the opening movement of the jaw relative to the central body. Also in such hitherto known arrangements the depth of each recessed lug was made greater than the diameter of the head of the T-shaped bolt so as to receive such head wholly therewithin.

Such previously known form of scaffolding coupling has been in extensive use for practically 30 years, but it is nonetheless very wasteful in material by reason of the above described configuration of the lugs on the central body.

The present invention has for its object the provision of an improved arrangement, which is considerably more economic in material used in the manufacture of the coupling as compared with this previously known form of coupling, while providing the same performance, i.e. having the same clamping and gripping characteristics.

SUMMARY OF THE INVENTION

According to the present invention, the central body of the coupling is of generally circular configuration peripherally, apart from the lugs, and the bolt hinging lugs are made of a depth sufficiently small as merely to embody a recess of such shallow depth as to provide merely a part-circular bearing recess which accommodates only a minor portion of the head of the T-shaped bolt, and the lugs to which the jaws are hinged are each devoid of oppositely extending flanges, so as to be of substantially rectangular, as opposed to T form in cross section, with the mass of metal in each of the two diametrically opposed lugs in each pair being substantially the same, and the opening movement of each jaw relative to the central body being limited by the free end of each rectangular section jaw hinge lug engaging with the metal of the jaw at a position between the inner ends of the two arms forming the fork end of the jaw to which said rectangular section lug is pivotally connected.

With the present invention it is found that for a coupling of the same overall size and having the same performance characteristics, a substantial saving in the weight of metal in each central body can be effected, of the order of 40%. Thus in the most common form in which the scaffold tube has an outside diameter of 4.9 cms. and the central body, including its two pairs of lugs, is formed as a one-piece forging, the weight of the central body is reduced from a value of about .57 kilo to .33 kilo.

This substantial reduction in the amount of metal in the central body for the same overall size of coupling and for the same performance permits of:

(a) In the production of a given number of central bodies, a reduction of approximately 40% in the mass and thus in the cross sectional area of the steel bar from which the central bodies are customarily forged, usually drop forged. Such reduction in mass facilitates and thus speeds up the handling of the bars during the forging operation and the reduction in cross section, in the case where a single central body is forged at one time permits of a smaller forging hammer or press being employed.

(b) Alternatively, without reducing the cross sectional area of the steel bar from which the central body is forged, a substantial increase in the number of central bodies is obtainable by forging a given length of bar, the increase in the number of bodies so forged being of the order of 40%.

For the same overall size of coupling and for the same performance such reduction in central body weight corresponds to a saving of about one sixth of the total mass of metal in the complete coupling.

3

The foregoing economy in the amount of metal used is of considerable significance in the drop forging manufatcure of a large number of similar couplings, as is customary and enables an important reduction in manufacturing cost to be effected.

Furthermore, in a large scaffolding structure embodying a large number of couplings in accordance with this invention, the consequent saving in weight in the complete structure is also of significance in permitting of a greater load to be carried by the complete structure or alternatively of some reduction in tube diameter and thus of tube cost being made for the same load to be supported with consequent economy in the scaffolding structure itself.

The aforementioned reduction in weight of the central body is effected by the above described reduction in overall dimensions of its two pairs of lugs and is further effected by the generally circular configuration of the periphery of the central body, as opposed to the hitherto generally rectangular peripheral configuration, apart from the lugs themselves, i.e. by eliminating the metal at each of the four corners of the rectangular shaped periphery of the central body in the hitherto known coupling of the kind specified.

A further very important feature of the present invention is that the mass of metal in the two lugs of each diametrically opposed pair of lugs is substantially the same. This permits of the metal flowing in the most efficient and thus in the most economical manner possible during the forging operation so as further to assist in the above-mentioned reduction in the diameter of the bars from which the central body is forged, or increase in the number of bodies forged from a given length of bar reduction in bar diameter.

A further very important advantage of the present invention is that, insofar as in the forging of each central body, a lesser mass of metal is required to be displaced for the same overall size of coupling having the same performance as existing couplings of the kind specified, it is possible on the same size of forging press or drop forging hammer as has hitherto been employed in forming the central bodies of couplings of the kind specified, to forge two central bodies simultaneously by the same hammer blow or blows, merely by suitably modifying the forging dies, so as to provide two side-by-side dies, as opposed to a single die for forming only one central body at a time, as has hitherto been the case with existing couplings of the kind specified.

For the successful forging of two bodies at the same time in the one forging press or drop forging hammer as hitherto employed in forging a single central body, it is expected that except possibly in the case of couplings of the smallest size it will be necessary to subject the round bar customarily employed, to a preliminary local swaging operation so as to effect a preliminary shaping of part of the bar metal, which swaged part serves to form in the subsequent forging operation, two integrally connected recessed lugs, each providing one of the two recessed lugs of the two bodies which are to be simultaneously forged, the effect of such preliminary swaging operation being to form the initially round bar to substantially rectangular configuration in cross section with the major axis of cross section parallel to the axis of pivoting of each T-shaped clamping bolt in the finished coupling.

At the same time the metal of the swaged portion of the bar is displaced longitudinally of the bar so as locally to elongate the bar and thus assist in obtaining the maximum number of central bodies with their associated two pairs of lugs, in accordance with this invention, from a given length of bar.

Accordingly, the invention further comprises a method of simultaneously forming a pair of central bodies and associated lugs of scaffolding couplings of the kind specified, which method is characterised by the step of taking a length of round metal bar and at a position intermediate two round bar portions locally deforming the bar to substantially flat form in cross section over a length great enough to provide in said flattened portion sufficient metal to form bolt hinging lugs, each associated with one of the two central bodies, by the said preliminary operation elongating th bar in the direction of the length thereof and subjecting the two round bar portions joined by the aforementioned flattened portion to a subsequent forging operation in which each of the cylindrical portions is forged between a pair of dies each conforming to the required configuration of the central body and simultaneously forging the flattened portion of the bar to the configuration of a pair of hinging lugs associated one with each of the pair of central bodies and at the same time forging the remainder of each central body, including the other three lugs thereof, from the metal of one of the two cylindrical bar portions so as to form two central bodies simultaneously by the same forging operation.

In a further important preferred form of this invention, each lug of each of the two pairs of lugs adjacent its junction with the central body, has an integral reinforcing portion extending from the central body in the direction of the extension therefrom of the adjacent lug, with the reinforcing portions of the one pair of lugs in each case forming a scaffold tube engaging extension of that central body seating which in securing a scaffold tube coacts with that hinged jaw which is associated with the other pair of the two pairs of lugs.

A scaffold coupling embodying this further important preferred form of this invention, in addition to possessing all of the advantages above specified, provides the following additional advantages:

(1) The coupler is greatly strengthened at the junction between the central body and each of the four lugs without significantly effecting the economies above specified.

(2) The reinforcing portions insofar as they constitute extensions of the seatings, increase the efficiency of the clamping engagement with the scaffold tube engaged by such seating. This is particularly the case where the scaffold tube is a vertically or substantially vertically disposed tube, i.e. an upright member of the scaffolding, supporting through the coupler a horizontal or inclined to the horizontal cross tube, with the in situ lower of the two upright tube engaging reinforcing portions being so formed, as to present at its lower side a sharp upright tube engaging edge, adapted to slightly deform the surface metal of the upright tube to grip this positively as opposed to frictionally, and thus effectively prevent the coupling slipping down the upright tube when fully tightened under its supported load.

The foregoing advantages are attained without imparing in any way the ability of the central body including the lugs to be formed as a forging, e.g. as a drop forging, in that the reinforcing portions extend from the central body in the direction of extension therefrom of the lugs and the flow of the metal in the formation of the lugs is thus in the direction to form also said reinforcing portions.

BRIEF DESCRIPTION OF THE DRAWINGS

One preferred form of the invention is illustrated in the accompanying drawings, wherein:

FIG. 1 is a side elevation of one form of scaffold coupling embodying the invention, one of the jaws being depicted in the closed position and the other in the open position.

FIG. 2 is a plan view of the central body of the coupling depicted in FIG. 1.

DESCRIPTION OF THE PREFERRED EMBODIMENT

Figure 3:
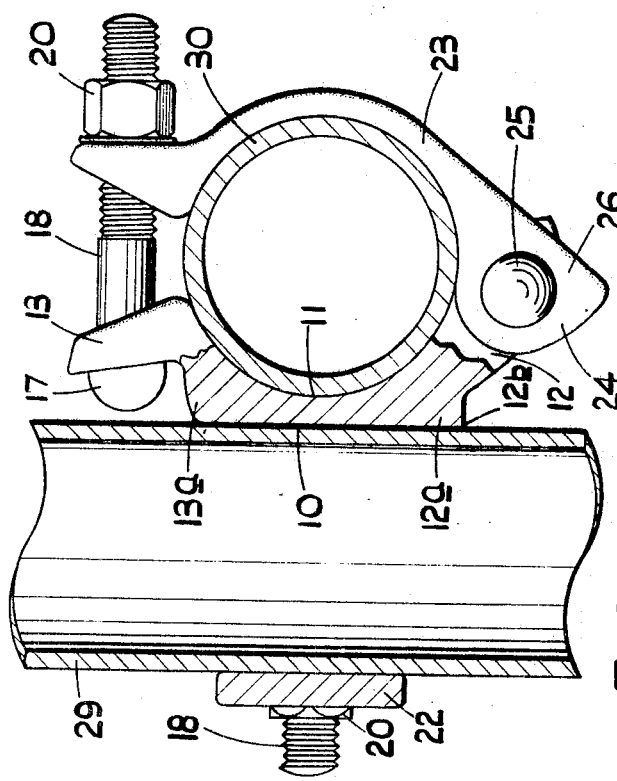
FIG. 3 is a cross sectional view of the coupler depicted in FIG. 1, shown in its final clamping position.
Figure 7:
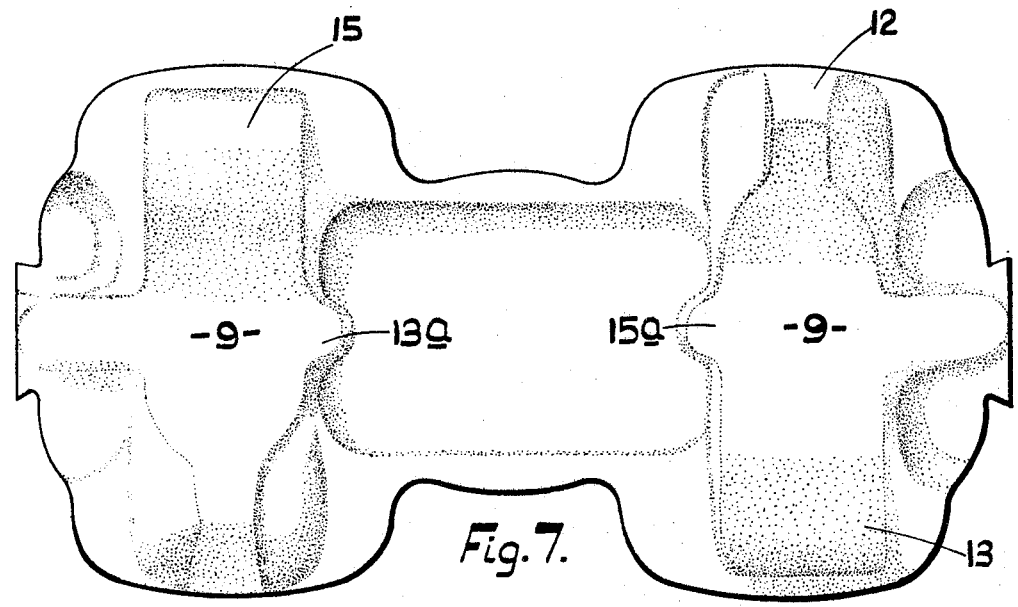
FIG. 7 is an inverted plan view of the forging depicted in FIG. 6.
Figure 6:
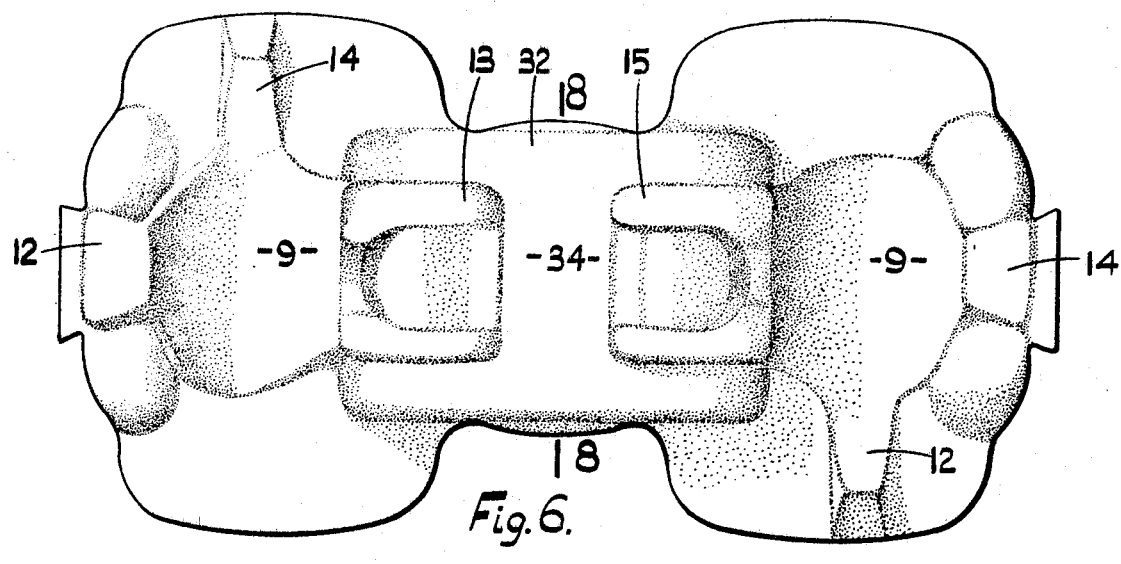
FIG. 6 is a plan view of the bar depicted in FIG. 4, showing a second stage of the manufacture of the pair of central bodies, i.e. depicting the bar partly forged.

Referring firstly to FIGS. 1 to 3 of the drawings, the coupling there illustrated is intended for use in connecting two scaffold tubes together, in fixed mutually perpendicular relationship and comprises a central body 9 of generally circular configuration peripherally, and embodying on each of its two sides two mutually perpendicular concave circular seatings 10, 11.

The circular periphery of the body has integrally formed therewith, two pairs of lugs 12, 13, and 14, 15, one of the lugs 12, 14, in each pair and which constitute hinging lugs being of generally rectangular form in cross section, with the other lug 13, 15, of each pair being formed on one side with a shallow part-circular bearing recess 16, which provides a bearing for the cylindrical head 17 of a T-shape clamping bolt 18, which head 17 has a diameter more than twice the depth of the recess 16 so that only a minor portion of the bolt head is received within the recess 16. The associated lug 13, 15, is thus made of a depth sufficient merely to provide this recess 16 of the above shallow depth.

Each recessed lug 13, 15, is formed with an elongated hole 19 through which the clamping bolt 17 passes, the free end portion of the clamping bolt carrying a nut 20 for engaging with the free end portion 21 of one of a pair of arcuate shaped jaws 22, 26; the other end 24 of each of which jaws is hinged by pin 25, one to each of the rectangular sections lugs 12, 14.

The said hinged end 24 of each jaw 22, 23, is forked so that the arms 26 of the fork extend on opposite sides of the corresponding lug 12, 14 and the free end 27 of each of these lugs 12, 14 is adapted as shown in FIG. 1 to engage with the metal of the jaw at a position 28 between the inner ends of the two arms 26 to limit the opening movement of each jaw 22, 23. This latter feature is of ractical importance in that with the jaw 22 of one-half of the coupling secured first, as is customary, to a vertically extending or upright tube, 29, forming one of the two tubes to be connected, then as shown in FIG 1, the jaw 23 of the other half of the coupling can be supported by the provision of this last mentioned feature in a substantially horizontal position to provide a rest for a horizontal tube 30, namely the other tube to be connected, before this is finally clamped by such jaw 23 in position.

Further, the central body 9 is formed integrally during the forging thereof, with two pairs of lug reinforcing portions 12a, 13a, 14a, 15a, each extending from the central body in the direction of and adjacent to the two pairs of lugs 12, 13, 14, 15 respectively.

Each pair of reinforcing portions 12a, 13a adjacent to the one pair of lugs 12, 13, constitute tube engaging extensions of seating 10, which coact with the jaw 22 secured by means of the other pair of lugs 14, 15, while the reinforcing portions 14a, 15a, adjacent to the pair of lugs 14, 15, constitute tube engaging extensions of seating 11 which coact with the jaw 23 secured by means of the pair of lugs 12, 13.

One of the reinforcing portions in each pair, namely, 12a, 14a, which are adjacent each jaw hinging lug 12, 14, are formed at the side of the adjacent seating 10, 11, respectively, with an outer sharp edge or corner 12b, 14b, of sharp right angle configuration in cross section and of substantially straight configuration as viewed in FIG. 2, but curved about the axis of curvature of the adjacent seating so as to engage with the vertical scaffold tube 29 engaged by such seating.

Thus, as shown in FIG. 3, in utilizing the coupler to secure a horizontal tube 30 to an upright tube 29, the coupler would in accordance with normal practice be clamped first to the upright tube 29, by engaging seating 10 and corresponding jaw 22 in clamping engagement with the upright tube, with the coupler in a position in which the other jaw 23 for securing the horizontal tube 30; thus with the part so disposed, the said edge 12b of reinforcing portion 12 in engagement with upright tube 29 is directed downwardly of the tube. Thus, when the horizontal tube 30 is secured and loaded, the associated weight which is applied to the coulpling at a position on the side of upright tube 29 nearest to tube 30 will cause the coupling to rock very slightly relative to tube 29 in a clockwise direction as viewed in FIG. 3, causing edge 12b to bite slightly into the adjacent surface metal of tube 29, and thus provide a positive grip in addition to a friction grip between the coupling and tube 29, whereby a substantially greater load can be supported without risk of the coupling slipping down the upright tube 29.

Figure 5:
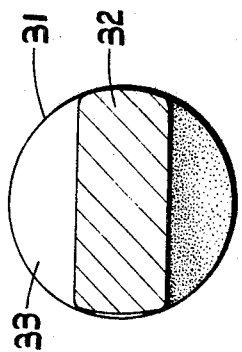
FIG. 5 is a sectional view on the line 5—5 of FIG. 4.
Figure 4:
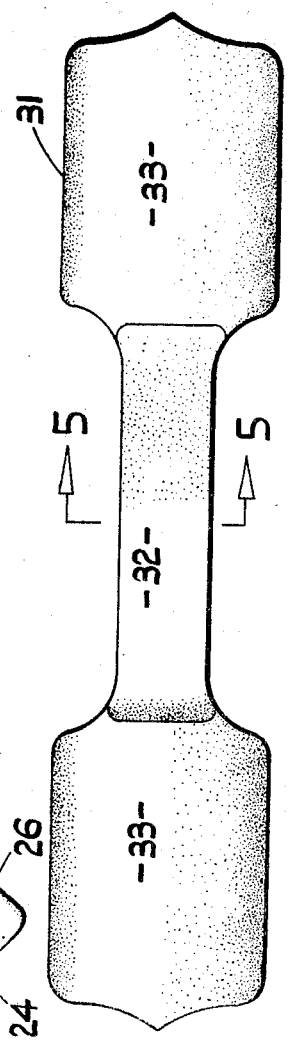
FIG. 4 is a side elevation of a length of round steel bar used in the manufacture of a pair of central bodies of couplings as depicted in FIGS. 1 to 3, showing the completion of the first or swaging stage in the manufacturing sequence.

Reference is now made to FIGS. 4 to 8 of the drawings, which depicts certain steps in the simultaneous manufacture of two central bodies 9 of the coupler depicted in FIGS. 1 to 3. First of all a length of round steel bar 31, desirably having a diameter of 3.8 cms. is subjected to a local preliminary swaging operation so as to form the bar locally with flattened rectangular section portions 32 as shown in FIGS. 4 and 5.

The bar is then severed into separate portions, each having the specific configuration depicted in FIG. 4, so as to embody two cylindrical parts 33, connected by the aforementioned rectangular portion 32, and this severed length of bar is then placed in a known form of forging press, or a drop forging hammer, the foregoing dies of which are shaped, to forge at one and the same time, two connected together central bodies 9, with one of the two hinging lug forming parts of each forging die being aligned with and adjacent to a corresponding part of the other die.

Thus when the severed length of bar 31 of the configuration depicted in FIG. 4 is placed within one of the two sets of forging dies of the press or hammer, with the major axis of cross section of the flattened portion 32 perpendicularly transverse to the direction of relative movement of the forging dies, the bar is forged by the press or hammer to the configuration depicted in FIGS. 5 to 8, with the flattened portion 32 forming a pair of aligned recessed lugs, i.e. lugs 13 or 15, and each lug being associated with one of the two central bodies and being joined integrally by a connecting web 34, also formed from the metal of the flattened portion 32.

The remainder of each of the two central bodies 9 with their remaining three lugs would be formed respectively from one of the two cylindrical bar parts 33.

Figure 8:
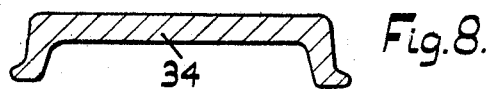
FIG. 8 is a cross sectional view on the line 8—8 of FIG. 6.

The metal in the connecting web 34, would, of course, be scrap, but as shown in FIG. 8 the cross sectional area of this is small, and indeed the amount of scrap is no greater than the scrap produced, with two otherwise identical separately forged central bodies 9, at the same position in relation to the body periphery, so as in no way to offset the economy in metal obtaining with the present invention.

From the foregoing, it will be understood that in addition to effecting a substantial economy in the amount of metal required to forge a given number of central bodies of the coupling and thus an important economy in the amount of metal in the complete coupling, a further most important economy in production cost is obtained by the ability, without increasing the size of the forging presses or forging hammers, to forge two central bodies, each forming part of one of two couplings, at one and the same time.

What is claimed is:
1. A scaffold coupling for connecting a pair of scaffold tubes in mutually transverse relationship, comprising:
   (a) a central body of generally circular configuration peripherally and having a pair of mutually transverse generally part-cylindrical oppositely directed tube-engaging seatings,
   (b) a pair of arcuate shaped tube clamping jaws associated respectively with said seatings and each having a respective free end and a respective forked end formed with a pair of laterally spaced longitudinally extending arms,
   (c) a pair of T-shaped clamping bolts each having a respective transverse head and a respective screw-threaded stem portion carrying a nut for clamping engagement with said free end of a respective one of said clamping jaws, and
   (d) four lugs extending outwardly from the periphery of said central body and arranged in two mutually transverse pairs of lugs associated respectively with said jaws with two lugs of each pair disposed on opposite sides of said central body,
   (e) each pair of lugs comprising a respective jaw-hinging lug and a respective bolt-hinging lug each of generally flat rectangular cross-sectional shape extending laterally in mutually transverse directions and having substantially equal mass.
   (f) said jaw-hinging lug of each pair of lugs being received between said arms of the associated jaw with the latter pivotally connected thereto, and having a free end portion which is engageable with the associated jaw between the arms thereof to limit pivotal movement of the associated jaw away from the associated seating, and
   (g) the bolt-hinging lug of each pair of lugs being formed with a respective through aperture and a respective recess at the side thereof directed away from the associated jaw, said bolts being associated respectively with said bolt-hinging lugs with the heads of the bolts engaging in said respective recesses and the shanks thereof extending through said respective apertures, and the thickness of the bolt-hinging lugs being such that said recesses afford respective part-circular bearing surfaces which accommodate only a minor portion of the heads of the respectively associated bolts, each of said lugs is formed with an integral reinforcing portion confined to the end thereof adjacent to the central body, with the reinforcing portions of each pair of lugs forming scaffold tube-engaging extensions of the seating associated with the jaw which is associated with the other pair of lugs and with each reinforcing portion being of less axial length as measured along the scaffold tube than its respective leg.

2. A scaffold coupling according to claim 1 wherein one of said reinforcing portions of each pair of lugs presents a sharp tube-engaging edge whereby, when either of said reinforcing portions with the sharp tube-engaging edge engages an upright tube received in the seating of which it forms an extension and is arranged as the in situ lower of the two reinforcing portions of the pair of lugs concerned, the sharp tube-engaging edge thereof slightly deforms the surface of the upright tube to grip this positively as opposed to frictionally under load imposed by a generally horizontal tube carried by the other seating.

3. A scaffold coupling for connecting a pair of tubular members together at an angle to each other, said coupling comprising a central body of generally circular configuration having a pair of arcuate tube-engaging seatings on opposite sides thereof, the axis of one arcuate seating being at an angle to the axis of the other arcuate seating, a pair of lugs extending outwardly from said central body to a position on opposite sides of each of said seatings, each pair of lugs including a jaw-hinging lug and a bolt-hinging lug located on opposite sides of each of said seatings, each of said lugs being forged of substantially the same mass of material, each of said bolt-hinging lugs having an arcuate recess on the side adjacent to said central body and in communication with an opening extending entirely through said bolt-hinging lug, a pair of generally arcuate tube-clamping jaws, each of said jaws having a bifurcated end portion swingably connected by a pivot pin to one of said jaw-hinging lugs of said central body, a T-shaped clamping bolt having a generally cylindrical crosshead swingably mounted within the recess of each of said bolt-hinging lugs, a screw-threaded stem portion extending through the openings of said bolt-hinging lugs and having a nut thereon for clamping engagement with the end of the tube-clamping jaws remote from said bifurcations, each of said jaw-hinging lugs having an outwardly extending projection, each of said clamping jaws having a shoulder located between said bifurcations and adapted to engage the outwardly extending projection of said jaw-hinging lug after the jaw has swung outwardly to a substantially horizontal position to limit swinging movement of the jaw away from the associated seating and to provide a support for a tube before the tube is clamped, each of said lugs is formed with an integral reinforcing portion confined to the end thereof adjacent to the central body, with the reinforcing portions of each pair of lugs forming scaffold tube-engaging extensions of the seating associated with the jaw which is associated with the other pair of lugs and with each reinforcing portion being of less axial length as measured along the scaffold tube than its respective leg.

References Cited
UNITED STATES PATENTS
1,918,843    7/1933    Holmes.
2,194,883    3/1940    Burton.

FOREIGN PATENTS
413,230    7/1934    Great Britain.
825,485    12/1937    France.

DAVID J. WILLIAMOWSKY, Primary Examiner

A. V. KUNDRAT, Assistant Examiner